Aug. 9, 1966  STEVEN POSTELSON (APOSTOLESCU)  3,265,329
FLYING PLATFORM-AUTOMOBILE-BOAT AND AIR
SUSPENSION CAR COMBINATION
Filed Aug. 27, 1963                              5 Sheets-Sheet 3
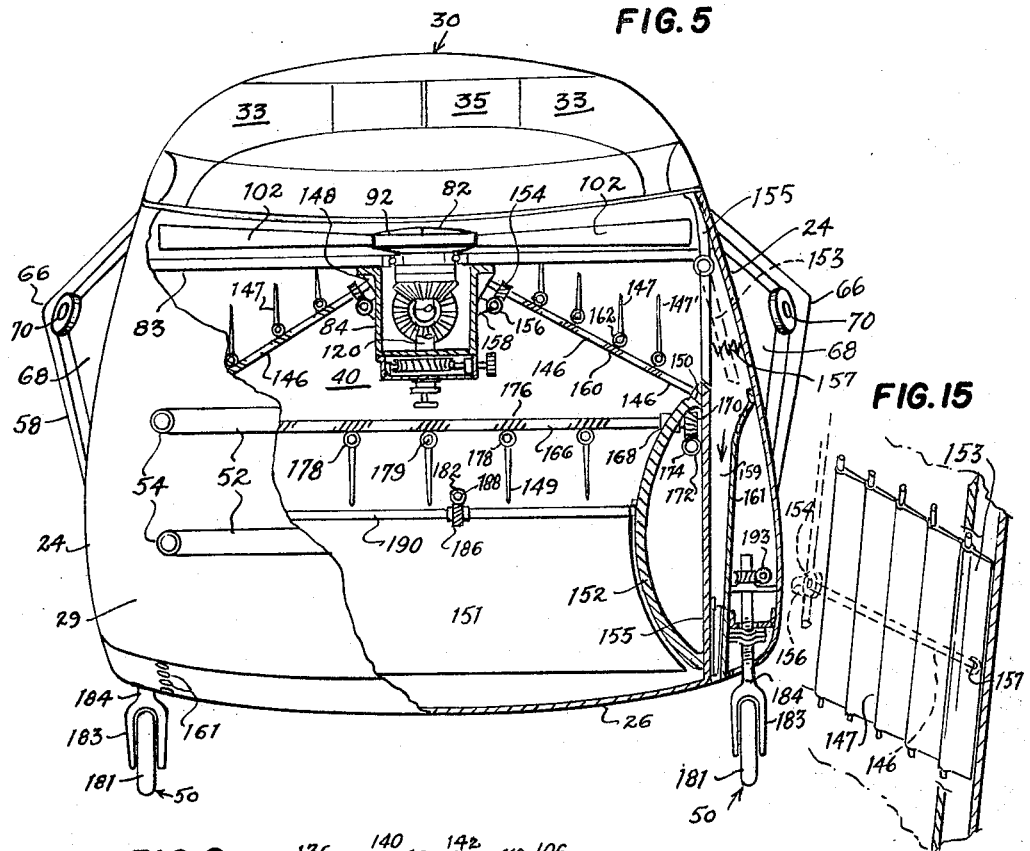
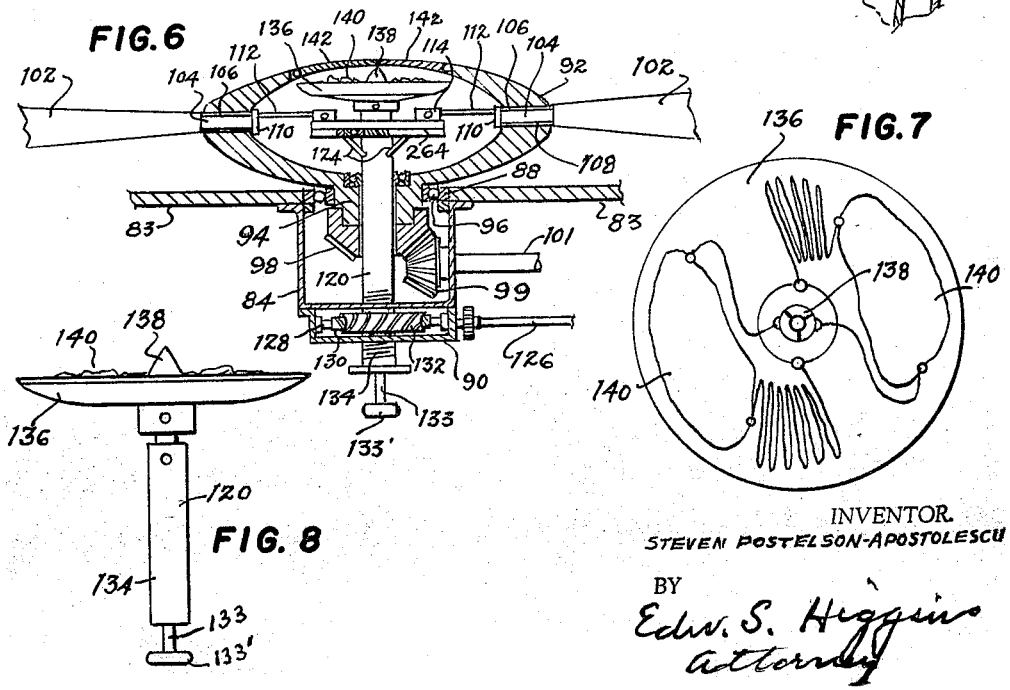
INVENTOR.
STEVEN POSTELSON-APOSTOLESCU
BY
Edw. S. Higgins
Attorney Aug. 9, 1966 — STEVEN POSTELSON (APOSTOLESCU) — 3,265,329
FLYING PLATFORM-AUTOMOBILE-BOAT AND AIR SUSPENSION CAR COMBINATION
Filed Aug. 27, 1963 — 5 Sheets-Sheet 4
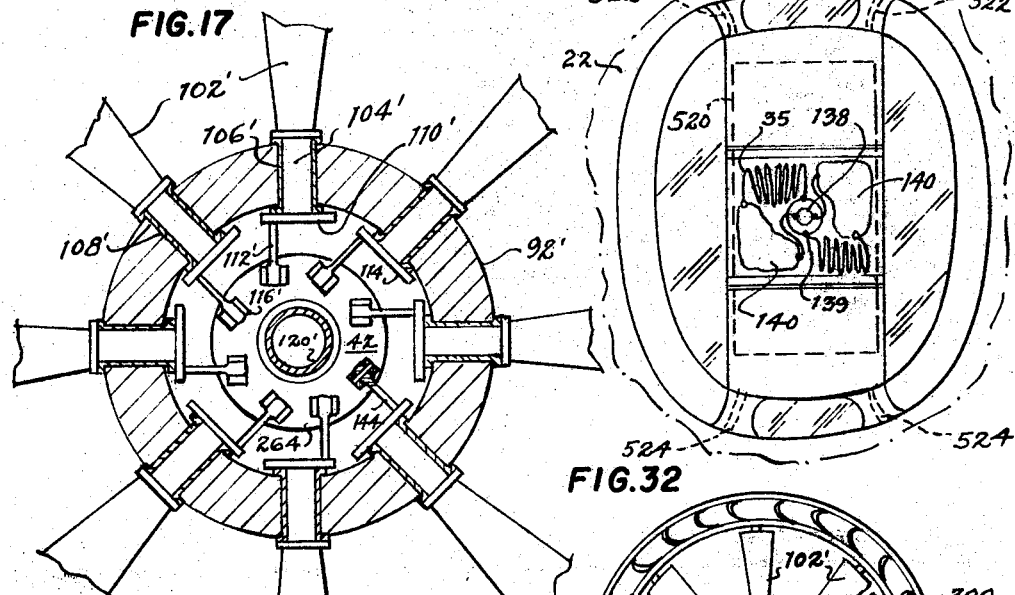
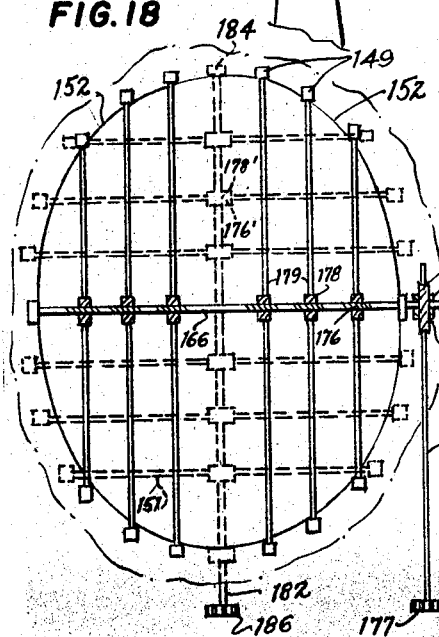
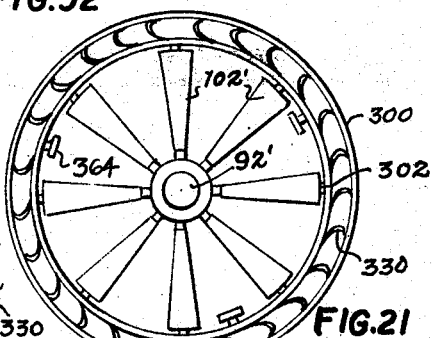
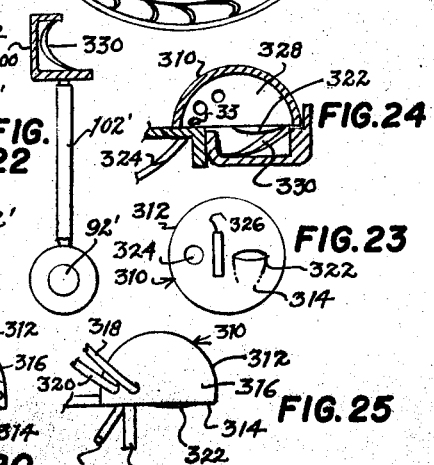
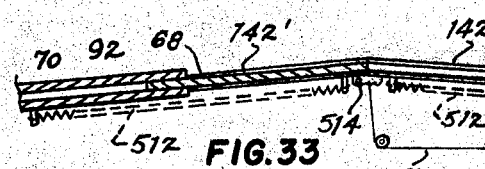
INVENTOR.
STEVEN POSTELSON-APOSTOLESCU
BY
Edw. S. Higgins
Attorney Aug. 9, 1966  STEVEN POSTELSON (APOSTOLESCU)  3,265,329
FLYING PLATFORM-AUTOMOBILE-BOAT AND AIR
SUSPENSION CAR COMBINATION Filed Aug. 27, 1963                                                    5 Sheets-Sheet 5

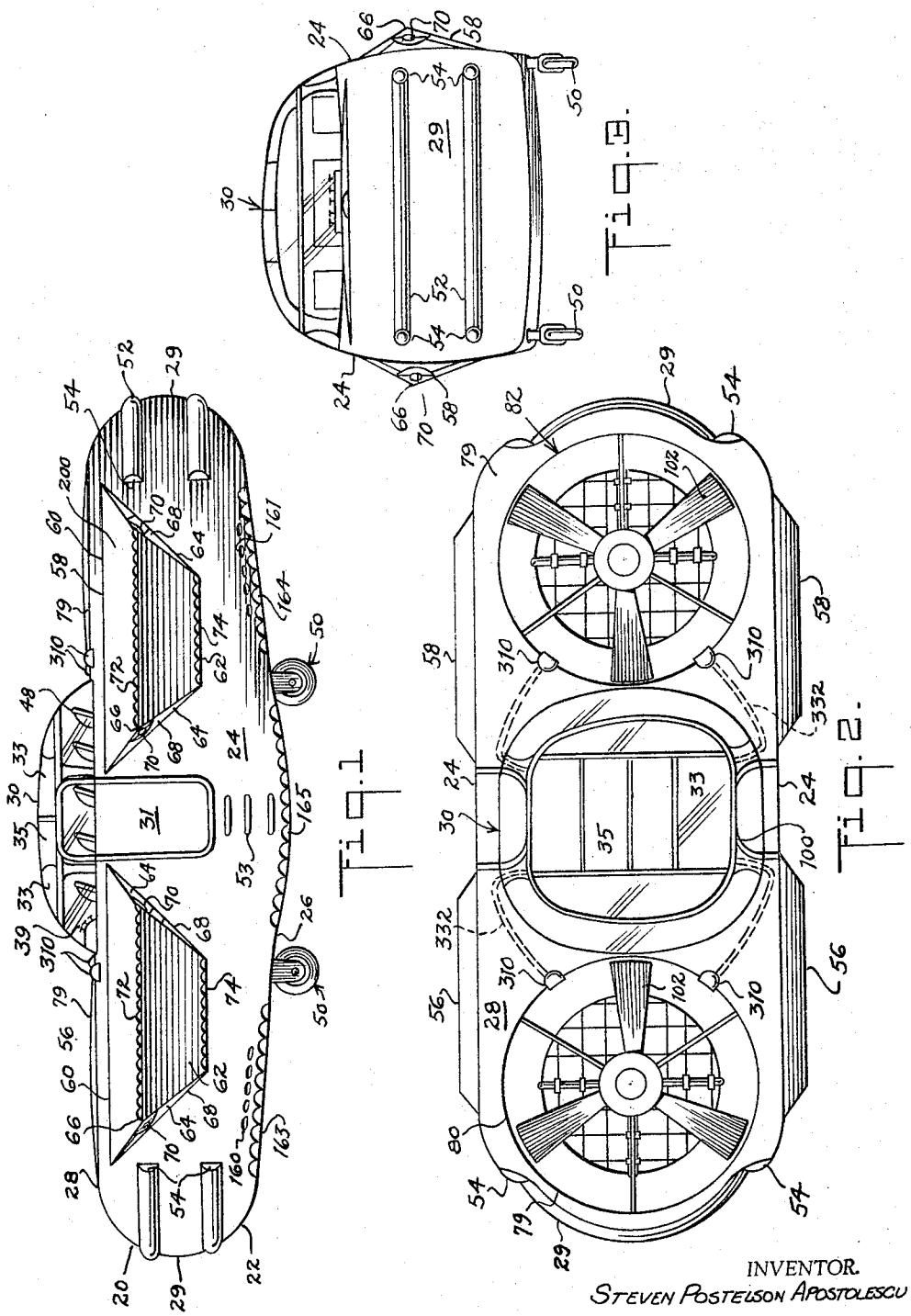

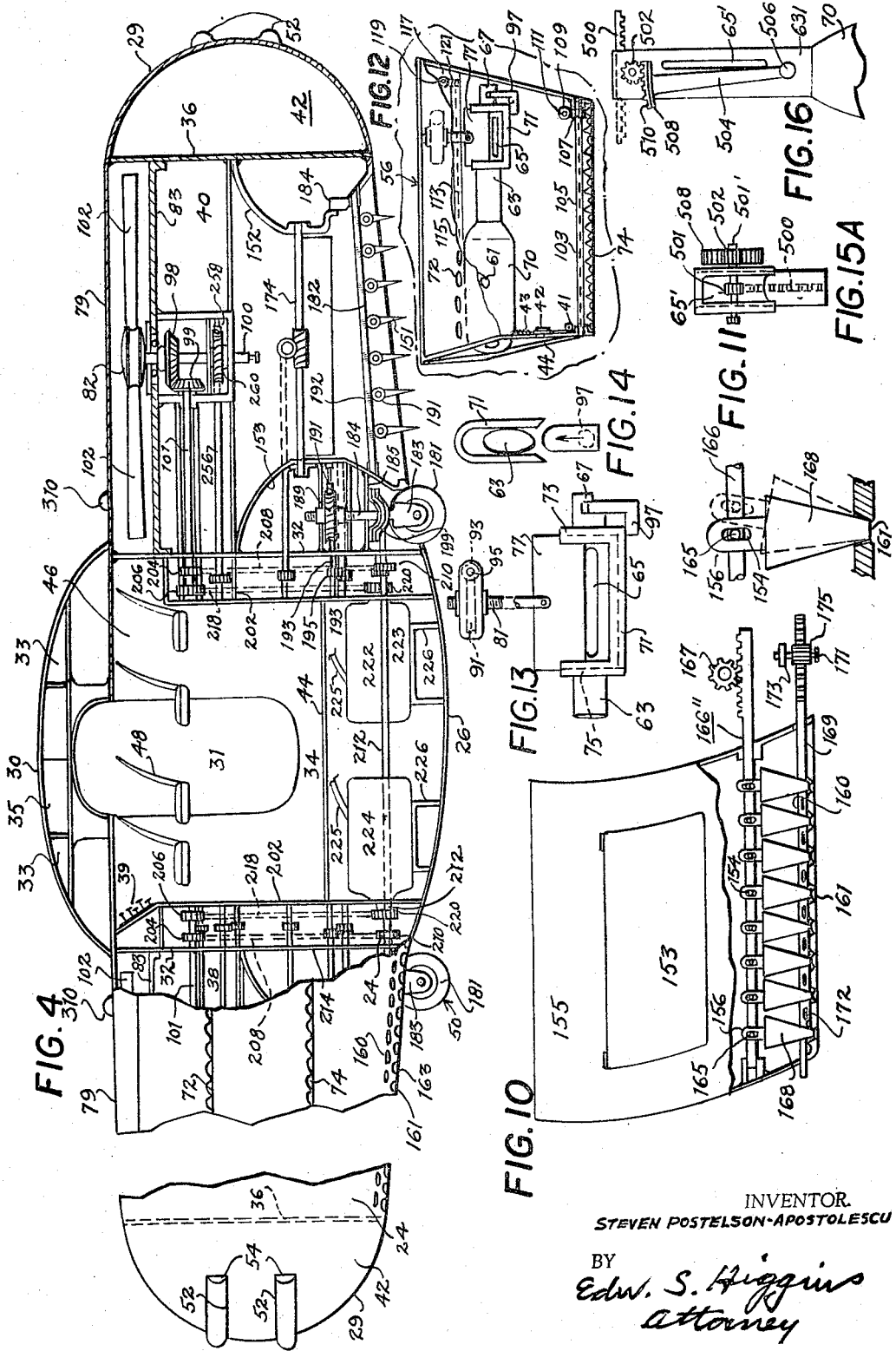

INVENTOR.
STEVEN POSTELSON-APOSTOLESCU
BY
Edw. S. Higgins
Attorney

United States Patent Office 3,265,329
Patented August 9, 1966

3,265,329
FLYING PLATFORM-AUTOMOBILE-BOAT AND
AIR SUSPENSION CAR COMBINATION
Steven Postelson (Apostolescu), 415 W. 35th St.,
New York, N.Y.
Filed Aug. 27, 1963, Ser. No. 304,926
17 Claims. (Cl. 244—2)

This invention relates generally to aircraft and more particularly to a combination aircraft and land vehicle wherein the device may travel through the air or travel upon a highway with equal facility, wherein the operator of the vehicle may be provided with selective controls for guiding the movement, speed and direction of the vehicle under all conditions.

An important object of the present invention is to provide a vehicle construction which may be employed with equal facility as an aircraft or as a land vehicle for traveling on the highways, wherein the vehicle is operated upon the well known principle of air cushion.

The invention may take the form of an airship, flying platform, automobile, boat or air suspension car.

The invention contemplates a vehicle that is compact and capable of flying with great facility and great speed and provided with great lifting power, in any medium, such as air, land and/or water, and readily, and automatically convertible from one use to another, without loss of time or necessity of getting out of the vehicle.

Another object of the invention is to provide a vehicle of this kind that operates upon a new principle of propulsion, involving a ring-like turbine engaged at the tip ends of the rotor blades. The ring-like turbine turning with the rotors and wherein the gases from the rocket engines force the ring-like turbine to turn at high speed of revolution, thereby insuring continuous operation of the rotors under all conditions or emergencies, thus greatly increasing the safety of the vehicle and its passengers.

Yet another object of the invention is to provide a vehicle of this type with parachutes in its rotor heads and at the top center of the body of the vehicle, which parachutes are adapted to be ejected automatically, under all conditions or when the engines have stopped operating, permitting a safe landing.

Still another object of the invention is to provide a vehicle of this type that is capable of traveling in any medium such as air, land, water, ice or snow, suspended on air cushion thereby permitting the vehicle to carry heavy loads close to the ground and silently, at great speeds for very long ranges, so as to avoid risk of being seen or heard for certain military and civilian purposes.

Still another object is to provide an airship that is capable of great lifting power, great speed or velocity and that can climb readily into space and that is capable of great maneuverability.

Other objects and advantages of the invention will be apparent from the description thereof to follow taken in connection with the accompanying drawings wherein:

FIG. 1 is a side elevational view of an aircraft embodying my invention.

FIG. 2 is a top plan view thereof.

FIG. 3 is an end view thereof.

FIG. 4 is an enlarged sectional view through the longitudinal center of the aircraft, parts being shown in elevation and parts being shown broken away.

FIG. 5 is an enlarged end view, parts being shown broken away and parts being shown in section.

FIG. 6 is a sectional view through the center of a rotor assembly.

FIG. 7 is a plan view of the parachute assembly.

FIG. 8 is a side elevational view of a detail of the rotor assembly.

FIG. 10 is a detail view of the vent valve mechanism.

FIG. 11 is a detail view of a vent valve in an enlarged scale.

FIG. 12 is a side elevational view of a wing structure, parts being broken away.

FIG. 13 is a detail view of the mechanism for opening and closing the opening in the gas exhaust pipe.

FIG. 14 is an end view thereof.

FIG. 15 is a plan view of the top fins in closed condition.

FIG. 15-A is a front view of the FIG. 16 modified form of mechanism for closing the discharge outlet of the exhaust pipe of FIG. 12.

FIG. 16 is a plan view of a modified form of mechanism for closing the discharge outlet in the exhaust pipe of FIG. 12.

FIG. 17 is a part plan and part sectional view of a modified rotor and blades assembly of the aircraft.

FIG. 18 is a diagrammatic view showing the arrangement of the fins and the actuating mechanism therefor.

FIG. 19 is a top plan view of a blade mounting of the form of FIG. 21.

FIG. 20 is a sectional view of the rocket engine as in FIG. 25.

FIG. 21 is a top view of the rotor, blades and ring-like turbine assembly.

FIG. 22 is an edge view thereof.

FIGS. 20, 23, 24, 25 inclusive are sectional, elevational and plan views of the rocket engines of the form of FIGS. 17, 21 and 24.

Figure 26:
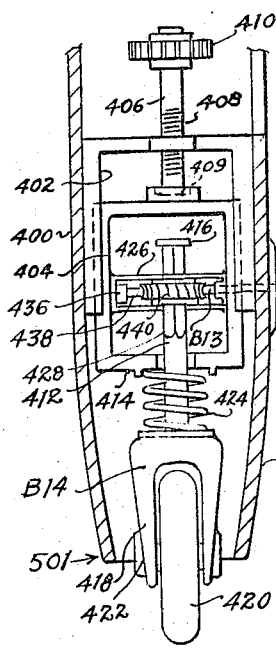

FIG. 26 is a part elevational and part sectional view of a modified form of combined landing gear and driving gear structure, parts being shown broken away.

Figure 27:
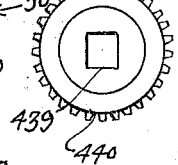

FIG. 27 is a plan view of the worm gear of FIG. 25.

Figure 28:
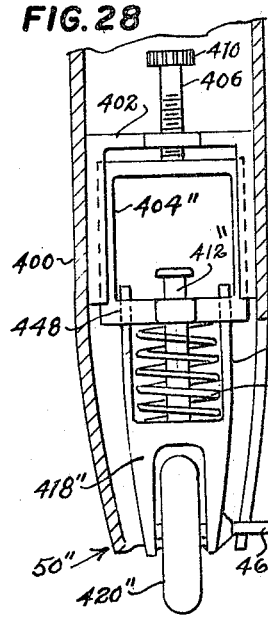

FIG. 28 is a similar view of still another modified form of combined landing gear and driving gear structure.

Figure 29:
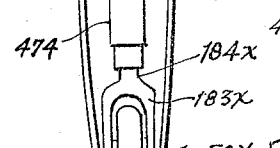

FIG. 29 is a part elevational and part sectional view of yet a further modified form of landing gear and driving gear structure.

Figure 30:
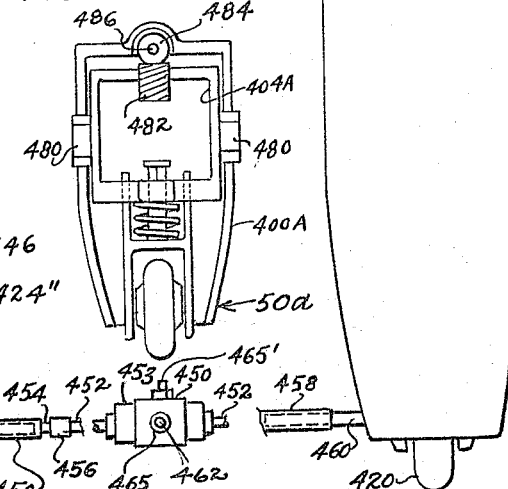

FIG. 30 is a similar view of still another modified form of landing gear and driving gear structure.

Figure 31:
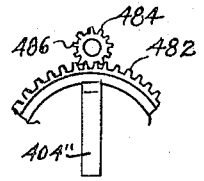

FIG. 31 is a side view of the FIG. 30.

FIG. 32 is a plan view of modified form of dome-shaped structure on top of the fuselage.

FIG. 33 is a sectional view of the top dome-shaped structure.

Referring more in detail to the drawings in FIG. 1, there is shown an aircraft designated generally at 20 embodying my invention. The aircraft comprises an elongated fuselage or body 22 in simulation of an automobile, including merging curved side, bottom and top and end walls 24, 26, 28 and 29, respectively. An opening in the center of the top wall is closed by a dome-shaped structure 30. A door 31 is provided in each side wall 24. A chemical fuel compartment 33 is provided at each side at the top compartment 35 at the center. The interior of the fuselage is divided by a pair of vertical walls 32, 32 into a central section 34 and the walls, 32, 32 and end walls 36, 36 define front and rear spaces 38 and 40 respectively (FIG. 4). Outwardly of the front and rear sections are nose sections 42, 42. The center section 34 is provided with a floor 44 adjacent its upper end. The dome-shaped structure 30, side walls 24, 24 and floor 44 define a combined cockpit and passenger compartment 46. Seats 48 are provided in the compartment 46.

A pair of landing and driving gear structures 50, 50 is hingedly and collapsibly mounted on and depends from the bottom wall 26.

Bumpers 52 are formed on the end walls 29, 29 and lamps 54 at the ends of the bumpers.

Steps 53 lead to each door 31.

In each side wall 24, 24, a wing structure 56 is provided at the front of the fuselage and a wing structure 58 at the rear thereof. Each wing structure in side elevation is generally rectangular in shape with elongated straight top edge 60, straight but shorter straight bottom edge 62 as viewed in FIG. 1, and slanting end edges 64, 64. Midway the top and bottom, the body of each wing structure bulges outwardly as indicated at 66 (FIG. 5). The top and bottom edges of the wing structures are soldered to the side walls 24, 24 and there is an opening 68 between the end of each wing structure and the adjacent side wall to permit passage of air. A jet engine 70 is mounted on the inner surface of each wing structure in the opening 68. Each engine 70 as seen in FIG. 12 has a fuel inlet pipe 61 and an exhaust pipe 63 with an elongated discharge opening 65 in its side wall and with a discharge opening 67 in its outer free end.

The opening and closing of the discharge openings 65 and 67 are controlled by valve mechanism shown in detail in FIGS. 13–12–16. This mechanism includes a U-shaped frame 71, with grooves 73 in its leg members 75. The frame is sleeved around the pipe 63. A plate 77 slides in the grooves 73 and is adapted to close the opening 65 in the side of the exhaust pipe. Plate 77 is fixed to one end of a threaded shaft 81 connected to a gear worm 91 in mesh with a worm 93 on a shaft 95 extending to the control chamber and turnable therein. An angular valve member 97 is attached to the plate 77 so that when plate 77 moves upwardly it opens discharge opening 65 in exhaust pipe 63 and carries member 97 upwardly which closes end opening 67 of pipe 63. On the contrary, when plate 77 moves downwardly, it closes opening 65 and member 97 opens opening 67 at the end of the exhaust pipe 63.

When worm gear 91 is turned, it raises or lowers the shaft 81 which in turn raises or lowers the plate 77 thereby opening or closing the discharge opening 65 in the exhaust pipe. At the same time, the angular valve member 97 opens or closes the end discharge opening 67.

Vents 72 are formed in the bulged out portions 66 and similar vents 74 are formed in the bottom edges of the wing structures. The vents 72 and 74 discharge gas when the exhaust pipes of the jet engines 70, 70 are closed to the atmosphere by means of the plates 97.

The exhaust gases escape from the wing structures through the end openings 65 and escape through the vents 72 and 74 to the atmosphere.

Means is provided for closing and opening the vents 74 in the bottom of the wing structures. This means includes a rotatable shaft 103 with spaced holes 105 therealong. A worm gear 107 on one end of the shaft 111 is turned by a round worm 109 on a shaft 103 leading and actuated from the control chamber. The shaft 103 is placed over the vents 74 in the bottom of the wing so that its holes 105 are adapted to register with the vents 74. Shaft 103 turns with the shaft 111 and if the holes 105 in shaft 103 are in register with the vents 74 the gases from the jet engines will move downwardly through the vents 74 into the atmosphere, but if shaft 111 is so turned that the holes 105 in shaft 103 are not in register with the vents 74 then the downward movement of the gases is stopped.

The means for controlling the opening and closing of the vents 72 includes a turnable-rotatable shaft 113 having holes 115 therealong actuated by a worm 117 on a shaft 119 actuated from the control chamber, the worm 117 engaging worm gear 121 fixed on the turnable shaft 113. The shaft 113 is adapted to be rotated for opening and closing the vents 72. The shaft 113 is placed over the vents 72 so that the holes 115 of shaft 113 are adapted to register with the vents to permit the gases from the jet engines to move downwardly through the vents 72 but if the shaft 113 is so turned that the holes 115 are not in register with the vents 72 then movement of the gases is stopped.

A plate 42 engaging a frame in the front side wing FIG. 12 is engaged to a spring 43 at one end, the spring is engaged in the wing body at other end. A wire 41 at the end of the plate 42, when plate 42 is pulled by wire 41 the vent 44 opens, when the wire 41 is relaxed the plate 42 closes vent 44.

In the front and rear sections 38 and 40 of the fuselage, below the openings 79 in the top wall 28, there are rotor assemblies 80 and 82 supported on horizontal members 83 extending across the space between the walls 32 and 36. The rotor assemblies are similar in construction and each includes as best shown in FIG. 6, a U-shaped casing 84 open at the top and depending from supporting member 83 under an opening 88 therein. A pan 90 is secured to the bottom of the casing 84. A hollow bulbous shaped housing 92 having a hub portion 94 is rotatably supported in the opening 88 in the supporting member 83 on ball bearings 96. A gear 98 is fixed on the bottom end of the hub portion 94 which meshes with a pinion 99 on a drive shaft 101. Turning movement of the shaft 101 is imparted to the housing 92. A plurality of blades 102 are carried around with the housing 92. Each blade has a hub portion or extension 104 extending through bushings 106 in radial openings 108 in the housing 92. Discs 110 are formed on the inner ends of the hub portions 104 to which is attached one end of an arm 112 offset from the center of the disc. The other end of the arm is attached to a bracket 114 on the top of a circular roll cam plate 264 having a central opening and fixed around the tubular member 120 by brackets 124, which tubular member 120 extends upwardly through aligned openings in the pan 90 and casing 84. The circular roll cam plate 264 is affixed to and supported on the tubular member 120 by brackets 124.

Means are provided for changing the pitch of the blades 102 including a shaft 126 extending from the pilot's chamber and extending through an opening in the pan 90. The inner end of the shaft is journalled in opposed bearings 128 on the inner surface of the side wall of the pan and formed on the shaft inside the pan there is a worm 130 turning with the shaft. Worm 130 meshes with a worm gear 132 which in turn meshes with external threads 134 on the outer surface of the tubular member 120. By turning shaft 126, the tubular member 120 may be moved up and down thereby moving the roll cam plate 264 up and down to tilt the blades 102 through arms 112' and thereby change the pitch of blades thereof. The lower part of the roll cam plate 264 rest fixed on the tube 120 and does not turn, the upper part of the cam roll plate on which the arms of the blades 102 are engaged on brackets 114 turn together with the blades 102 and rotor hub 82.

A dished shaped plate 136 is fixed on the top end of the tubular member 120 and supported on said plate 136 there is a rocket 138. A parachute 140 in folded condition is also supported on the plate 136 with one end operatively attached to the rocket 138 at one end and to plate 136 the other end. Above the plate 136, the housing 92 has an opening which is closed by hinged doors 142, 142. A rod is slidably connected through tube 120 to the rocket 138 on the plate 136. The rod 133 has a handle 133'; when the handle 133' is pulled down the rocket will automatically be activated and will force up the parachutes 140—140 through doors 142—142. This way permitting a safe landing in any emergency.

The fin arrangement and system will now be described. The aircraft has three sets of fins, a top set 147, an intermediate set 149 and a bottom set 151. The top and intermediate fins 147 and 149, respectively, are disposed longitudinally of the fuselage and the bottom fins 151 are disposed transversely of the fuselage. The fins control the raising, lowering and backward flying of the aircraft.

In each of the sections 38 and 40 housing the rotor assemblies 80 and 82, shafts 146 are supported in bearings 148 on the top ends of the casings 84 and in bearings 150 a circular frame 152 inwardly of the side walls 24, 24, the bearings 150 being lower than the bearings 148 so that the shafts 146 are disposed at an angle of about 45 degrees to the horizontal as best seen in FIG. 5. At the top of each of the shafts 146 there is a worm gear 154 meshing with a worm 156 on a bracket 158. Worms 160 are spaced along each shaft 146 meshing with worm gears 162 on the bottom ends of fins 147 midway the ends thereof, whereby the fins are moved to vertical open position as shown in FIG. 5 and to horizontal closed position as shown in FIG. 15. This operation is applied only when the aircraft is on the ground and it is desired to travel on the air suspension principle whereby the aircraft is permitted to raise only about ten to fourteen inches off of the ground but does not permit the aircraft to fly.

The lowermost fin 147 is provided with an extension pin 147' for a purpose to be later described.

When the top fins 147 are tilted downwardly the fins will cover all of the openings under rotor assemblies 80 and 82 and during this tilting movement the extension pins 147' on the lowermost fins 147 engage doors 153 hingedly mounted on vertical supporting walls 155 inwardly of the side walls 24, 24. The doors are yieldingly held closed by springs 157. The door openings communicate with passages 159 between the supporting walls 155 and another wall 161' between each supporting wall 155 and the adjacent side wall 24. The passages 159 lead to openings or vanes 161 in the bottom wall 26 of the fuselage. The control of the compressed air in the passage 159 to the exhaust openings 161 is done by hollow valves 168'. When the compressed air presses against conical shaped valves member 168' the air will go straight down through the hollow valves 168' if the valves 168' are vertically positioned; but if the valves 168' are tilted backward the craft will move forward and if the valves 168' are tilted forward the craft will move backward. This operation will permit the suspension of the craft at a fixed point; it is also a forward or backward motion on land, water or ice, snow, etc. The fins 147 on the right hand side of the rotor housing move and close clockwise or to the right as viewed in FIG. 5, and the fins 147 to the left thereof move and close counterclockwise or to the left.

When the fins 147 are closed as shown in FIG. 15 the rotor assembly such as rotor assembly 80–82 drives the compressed air rapidly downwardly through the passage 159 and out through the opening 161 to the atmosphere thereby providing the air suspension operation needed.

In operation, when the fins 147 are closed to the right or left the air compressed by the rotor blades are stopped from moving downwardly and are directed sidewise to the right and left into the side air chambers 159, 159' and against the valves 168' positioned over the vents 161 and because said valves are tiltably mounted and are hollow, the compressed air from the chambers 159, 159' passes through the valve member 168' and vents 161 to the atmosphere providing the so-called air suspension ground effect but causes no flight. Accordingly when the valves 168' are tilted forwardly the aircraft will go forward; when the valves are tilted backwardly the aircraft will go backwardly; and when the valves are straight up and down, the aircraft will stay in the same position. Thus forward or backward motion is imparted only when the valves 168' are tilted forwardly or backwardly.

The direction of the aircraft during air suspension is obtained as follows: the shaft 169, with its holes 172 in register with the top of vents 160, is turned whereby the air will escape either to the right or left pushing the aircraft to the right or left according to the needs of the pilot. This operation is used only in the air suspension car maneuvering to control the direction of the aircraft.

The intermediate fins 149 include a shaft 166 disposed horizontally and transversely of the fuselage below the shafts 146, the ends of shaft 166 being journalled in sockets 168 in the frame 152. The shaft 166 is turned by a worm gear 170 on one end of the shaft meshing with a worm gear 172 on a shaft 174 (FIGS. 5–18). Worms 176 spaced along shaft 166 mesh with worm gears 178 mounted on shafts 179 supported at the inner end edges of the fins 149, on frame 152.

Shaft 174 at one end carries a worm 172 and at its other end carries a gear 177, disposed in the pilot's chamber 202. By turning shaft 174, the fins 149 will be tilted to the right or left as desired, to drive the air laterally. This maneuver permits the directional control of the aircraft in the air, to the right or left.

The bottom set of fins 151 are larger than the top or intermediate fins and are disposed under the intermediate fins 149. The bottom fins 151 are disposed across the fuselage at the bottom thereof. A shaft 182 is disposed below shaft 166 and arranged horizontally and longitudinally of the fuselage with its ends journalled in socket bearings 184 in the frame 152. Shaft 182 is turned by a worm gear 186 midway of the shaft 190 meshing with a worm 188 on a shaft 182 extending to the control chamber 202. The fins 151 are tiltable backwardly for the forward motion of the aircraft, straight down in position for raising the aircraft in air and are tilted forwardly to reverse the forward motion, or to go backwardly. The fins 151–151' of the front and rear rotor assemblies are connected so that they are operated in unison or separately as desired, for better control of the aircraft in the air.

The fuselage is provided with a set of horizontally disposed vents 160 at the front adjacent the bottom of the fuselage and another set of horizontally disposed vents 161 at the rear, in the side walls 24, 24. In the bottom wall 26 of the fuselage, vertically disposed vents 163 are provided at the front and similar vents 164 at the rear and similar vents 165 at the center. The opening and closing movements of the vertically disposed vents 163, 164, 165 are controlled by a ratchet bar 166", FIG. 10, actuated from the control chamber 202–202' meshing with a gear 167 and connected to conical shaped valve members 168. The valve members 168 when disposed truly vertical or straight, direct the air downwardly vertically as seen in FIG. 10. When valve members 168 are tilted backwardly, the aircraft is provided with air suspension and forward motion at the same time. When the valve members are tilted forwardly, backward movement of the aircraft is permitted. The valve members 168 are pivotally connected to the ratchet bar 166 by means of pins 165 on the ratchet bar disposed in slots 154 in extensions 156 on the valve members 168.

The opening and closing of the horizontally disposed vents 160 are controlled by slidable ratchet bar 169, gear 173 and gear 175 on shaft 71. The ratchet bar 169 is formed with spaced holes 172 adapted to register with the vents 160. When gear 175 turns, the ratchet bar slides to the right or left so as to open or close the horizontal vents 160 thereby controlling the direction of the air and the movement of the aircraft to the right or left. This operation is necessary only when it is desired to control and direct the aircraft during air suspension operation.

The combined landing gear and driving gear structures 50, 50 each includes a wheel 181, rollably mounted between the bifurcated end 183 of a shaft 184. Shaft 184 extends upwardly through a plate 185, between wall 32 and frame 152. The upper end of shaft 184 is externally screw threaded which threads engage the threaded hub 120—120 of a worm gear 189 meshing with a worm 191 on a shaft 193. The shaft extends through wall 32 and carries a pinion 195 on its inner end. The bifurcated end 183 of shaft 184 engages a cluster of leaf springs 199 fastened at their ends to plate 185. The wall 32 and frame 152 define a well housing the combined landing gear and driving gear structure. The shaft 184 is adapted to move up and down freely.

The actuation and operation of the rotors 80 and 82 will now be described.

Each rotor is driven by the shaft 101 which extends into and across the control chamber 202. A pair of spaced gears 204 and 206 is fixed on the shaft 101 inside the chamber 202. A chain 208 is trained around the gear 204 on shaft 101 and around a gear 210 on shaft 212 extending from front to rear of the fuselage on chamber 202' and gear box 450. Another chain 218 is trained around the gear 206 on shaft 101 and around a gear 220 fixed on the drive shaft of either engine 222 or 224 mounted on a bracket 226 on the center bottom wall 26. This arrangement permits the driving of the rotors by the two engines or by only a single engine at the same time. The shaft 212 extends from the front control chamber 202 to the front control chamber 202' and goes farther in the rear into the gear box 450. The gear box 450 is driven constantly but is not connected when in flight; only when on the road and operating as an automobile, the shaft 212 is automatically connected to drive the gear box and its shaft and driving wells.

Figure 9:
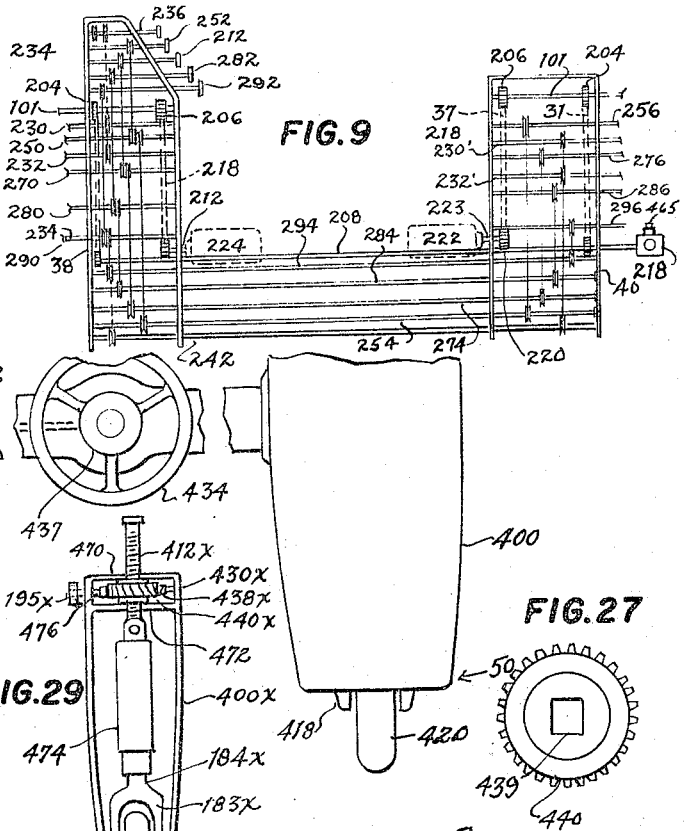
FIG. 9 is a diagrammatic view showing the controls of the aircraft.

With particular reference to FIG. 9, the control system for the rotors will now be described. The controls are located in the central compartment 34. The front rotor 80 is driven by engine 224 through drive shaft 212, gear 220, chain 218, gear 206, shaft 101, pinion 99 and gear 98.

The rear rotor 82 is driven by engine 222 through engine drive shaft 223, gear 220 on shaft 223, chain 202, gear 206, shaft 101', pinion 99 to gear 98. Fuel supply pipes 225 lead to the engines 224 and 222. When engines 224-222 turn, the rotors will turn, and if one engine stops the other engine still will drive the rotors 80-82 through shaft 212.

The control for the top fins as shown in FIG. 9 includes shafts 230, 232 extending across into control chambers 202 and connected by wire and pulleys to topmost shaft 236 on the pilot's control board. Shafts 230, 232 are also connected by wire and pulleys to shaft 242 which extends from the front control chamber 202 (38) to the rear control chamber 202' (40). In rear chamber 202' (40), the shaft 242 is connected by pulley and wire to pulleys on shafts 230' and 232' in rear control chamber 202' (40) so that when shaft 236 is turned in the pilot's chamber, the shafts 230, 232 will turn which will turn shaft 242. The shaft 242 will turn the shafts 230', 232' in rear control chamber 202' (40) which control the fins 147-147' in the rear rotor system 82 and in the front chamber 202 (38). The shaft 230 and 232 control the fins in the front rotor system 80. By reasons of this control system, the fins may be closed for air suspension travel of the ship or may be opened for flying.

Shaft 250 in the front rotor control chamber 202 (38) has two pulleys, one of which is connected by wire or chain to pulley on shaft 252 in the pilot control board 39; the other pulley being connected by a chain to a pulley on shaft 254. Shaft 254 extends to chamber 202' (40) in the rear rotor system where it is connected by a pulley and wire to shaft 256 in the rear control chamber 202 (40) shaft 256, through worm 258 and gear 260 controls the raising or lowering of the tube 120 which controls through its roll cam plate 264 the variable pitch of blades 102 on rotor 82 and 80.

Shaft 270 which extends from the front rotor to control chamber 202 has two pulleys, one of which is connected by wire or a chain to a pulley on shaft 272 on the pilot's control board; the other pulley being connected by a wire or a chain to a pulley on shaft 274. Shaft 274 extends to the rear control chamber 202' (40) in the rear rotor system 82 and by means of pulley or chain is connected to a pulley on a shaft 276 in the rear control chamber 202'. When shaft 272 in front chamber 202 (38) is turned, shaft 270 is turned which turns shafts 274 and shaft 276 which control the fins 149 in the front and the fins 149' in the rear. This set of fins 149 control the direction of the aircraft when in flight, to left or right.

Shaft 280 in chamber 202 (38) of front rotor system has two pulleys on the control chamber 202, one of which is connected by wire or a chain to a pulley on shaft 282 on pilot's control board; the other of which is connected by wire or chain to a pulley on shaft 284 in the front control chamber 202. Shaft 284 extends to the chamber 202' in the rear rotor system where it is connected by a pulley and wire or chain to a pulley on shaft 286 in the rear chamber 202'. Shaft 286 controls the raising and lowering of the landing gear system.

Shaft 290 in the front chamber has two pulleys, one of which is connected by a wire to a pulley on shaft 292 on the pilot's control board; the other of which is connected by a wire to a pulley on a lower shaft 294 in the front control chamber 202. Shaft 294 extends to the control chamber 202 in the rear rotor system where it is connected by a pulley and wire to a pulley on shaft 296 in the rear control chamber 202'. Shaft 296 controls the front and rear sets of fins 151 and 151' and these fins control the raising of the airship and the propulsion of the airship in the air and its flight direction up, forward or backward.

Around the openings 79 in the top wall 28, another embodiment of the invention in the form of rocket engines 310, two being shown at each opening, are supported, for utilizing the rocket engines to drive the rotors 102, 102' when engines 222, 224 fail to operate. Each rocket engine 310 as shown in FIGS. 1 and 2 and 21–24 consists of a hollow semispherical shell 312, with a bottom wall 314 and side wall 316. Fuel inlet pipes 318 and 320 enter through openings in the side wall. An exhaust opening 322 is formed in the bottom wall 314. An exhaust pipe 324 leads out through the bottom wall. A wall 326 depends down from the bottom wall 314. The bottom and side walls define an explosion chamber 328 and when liquid chemical fuel is introduced into the chamber 328 an explosion occurs and the compressed gas from the chamber 328 will be forced at an angle through opening 322 against the teeth 330 of the turbine ring 300. See FIG. 24. The engines 310 are supplied with fuel from supply tanks through pipes 332. The extra exhaust opening 331 in the bottom of the engines 310 lead to pipe 324 and can be closed or opened to divert the gases in other direction of the aircraft fuselage.

In FIGS. 26 to 30 inclusive, modified forms of combined landing gear and driving gear structures are illustrated. In FIG. 26 the combined landing gear and driving gear structures 50' are housed in hollow cylindrical extensions 400 depending from the bottom wall 26 of the fuselage. Each structure includes an inverted U-shaped frame 402 secured to the inner surface of the extension. Another closed rectangular shaped frame 404 is slidably mounted on the frame 402. A threaded shaft 406 extends upwardly from the top of frame 404 through a hole 408 in the frame 402. A gear 410 is fixed on the top free end of shaft 406. Another shaft 412 extends upwardly through a hole 414 in the bottom of frame 404. The top 428 of shaft 412 is square and is formed with a head 416 and its bottom has a bifurcated extension 418 to rotatably receive a wheel 420 on a shaft 422 supported by the extension. A coiled spring 424 around the shaft 412 between the bottom of the frame 404 and the bifurcated extension 418 urges the wheel outwardly of the extension. A closed frame 426 fits in the space between the sides of the frame 404. Shaft 412 extends through aligned holes in frame 426, which holes are square in cross section to receive the squared portion 428 of the shaft 412 permitting up and down movements of the shaft but preventing lateral movement thereof. A rotatable shaft 430 extends through a side opening in the extension 400. Shaft 430 extends through a sleeve 432 to a hand wheel 434 in the control chamber and has its other end journalled in a bearing 436 in the frame 426. The end of the shaft 430 supports a worm 438 inside frame 426 which meshes with a worm gear 440 on the shaft 412. The worm gear 440 has a square central hole 439 to receive the square portion of the shaft 412. Turning of the hand wheel 434 moves the shaft 430 which in turn moves worm gear 440 which shifts the shaft 412 to the right or left as desired, thus providing perfect directional control of the craft when on the ground and used as an automobile. The spring 424 absorbs the landing shocks and permits a soft suspension drive for the craft on the ground.

The modified form of combined landing gear and driving gear 50″ for the rear of the aircraft shown in FIG. 28 differs from the form of combined landing gear and driving gear 50′ of FIG. 26 in that the bifurcated extension 418″ of the shaft 412″ is formed with upstanding fingers 446 which extend through holes 448 in the bottom of the closed frame 404″. The holes and fingers guide the up and down movements of the shaft 412″ and wheel 420″ and permit up and down movement but not lateral movement of the bifurcated extension 418″. The bifurcated extension is adapted to be moved up or down carrying the wheel 420″ therealong by means of a turnbuckle arrangement including a gear box 450. A shaft 452 extends outwardly from each end of the gear box and is operatively connected to the gearing 453 inside the box and controlled by a control lever 465. Each shaft 452 is connected at its outer end to the end of another shaft 454 by means of a universal joint 456. The other end of shaft 454 is connected to a sliding sleeve 458 sleeved around one end of a sliding shaft 460, the other end of the shaft being connected to the bifurcated extension 418″. The gearing in the box is turnable by means of a shaft 462 carrying worm 465 inside the gear box and actuated from the control chamber 202 through a throttle lever 465′.

In operation, when the wheels 420″ are in downward extended position, the universal joint connection permits the wheels to oscillate up and down so as to expand or retract the wheels. In travelling along the ground, the springs 424″ and universal joint 456 permit a soft suspension and permit the wheels to be retracted when flying. The finger and hole suspension of the bifurcated extension permits up and down movements but prevents movement to the right or left of the shaft and wheel.

Still another modified form of combined landing gear and driving gear structure 50x is illustrated in FIG. 29. In this structure 50x, upper and lower plates 470 and 472, respectively, at the top of the cylindrical extension 400x provide a support for the threaded shaft 412x. A shock absorber device 474 is operatively connected at its top end to the bottom end of the shaft 412x as indicated at 476. A shaft 184 with bifurcated extension 183x is operatively connected to the bottom end of the shock absorber device 474. Shaft 412x extends through a threaded central opening in a worm gear 440x turned by means of a worm gear 438x on a shaft 430x supporting a gear 195x on the outside of which is connected to actuating means leading to the control chamber. Turning of shaft 430x moves the wheel 50x up and down. In normal conditions, the hydraulic shock absorber device controls the suspension of the craft on the ground.

A still further modified form of combined landing gear and driving gear structure 50a is shown in FIG. 30. This form differs from the form shown in FIG. 26 in that the closed frame 404a pivots on opposed sleeves 480 extending from the sides of the frame through openings in the cylindrical extension 400a. The frame is pivoted or oscillated by means of a worm gear 482 on the top of the frame meshing with a worm 484 on shaft 486 leading to the control chamber and actuated therefrom. No frame 402 and no turnbuckle actuating mechanism is used in structure 50a.

In FIG. 16 modified form of mechanism for controlling the opening and closing of the elongated side discharge opening 65′ in the exhaust pipe 63′ of the jet engine 70′ is shown. This mechanism includes a ratchet bar 500 slidably mounted in the end of the exhaust pipe 63′ meshing with a gear 501–502 mounted on the side of the exhaust pipe 63′. An arm 504 is pivotally mounted on the exhaust pipe as indicated at 506 and carries an arcuate shaped plate 508 with teeth 510 meshing with the teeth of gear 502. By reason of this construction when the ratchet bar 500 is actuated the arm 504 swings over the opening 65′ closing the same and opening the end of the pipe 63′; reversing the operation will close the exhaust end of the pipe 63′ and open the opening 65 on the pipe body 63′.

In FIG. 33 a mechanism for controlling the opening and closing of the swinging doors 142′, 142′ is shown. The doors are urged to open position by springs 52 fixed at one end to the doors and at the other end to the housing 92. A hinged clasp 514 holds the doors in closed position and a cable 516 extending to the control chamber and attached to the clasp actuates the clasp to open the doors.

In FIG. 32 a modified form of dome-shaped structure 30x′ is shown disclosing fuel tanks 520 with outlet pipes 522 leading thereto and with outlet pipes 524 leading therefrom.

Parachute compartment 35 has two sets of parachutes 140 engaged at one end to the ring 139 at the center of the chamber 35 and the other end engaged on rocket 138; rocket 138 is connected with the cable 516, FIG. 33. When the cable 516 is pulled automatically the doors 142—142 open and the rocket goes up taking along the parachutes, and because the parachutes are solidly tied to the ring 139 on the compartment 35, will permit the aircraft to land safely in emergency.

In operation, when the vehicle is on the ground, the rotor blades are kept on an inactive angle. The rotors are so connected to the engines and to each other by shafts and controls to such an extent that the craft can be instantly converted to an automobile type vehicle to be driven on the land such as a highway; or to be converted to a water craft or to an airship for flying through the air or to a craft using air suspension principle over the land and water.

When ready to fly, the craft rotors are activated and the blades adjusted or regulated in order to get a certain amount of variable pitch, the power engine being increased or reduced according to the need, starting with one, two or more engines until the craft is airborne, at which time the cross fins will be operated to control the air that is compressed downwardly and thus obtain the forward motion. When this stage of flight is attained, the ram jet engines located on the four side wings of the craft will be activated, thus doubling or tripling the speed of the craft. The angular wings and jet engines provide a greater lifting power, a longer range, longer rotor life and cheaper maintenance of the craft.

The craft can be converted to air cushion power drive readily and instantly by merely flattening the two sided angular fin sets 147—147; the last fin of which has a longer point and engages and presses open the two sided door on the wall of the craft and permits the air compressed by the rotor blades to enter into the channel between the walls and escape downward to the vertical valves that provide the air cushion phenomena. The vertical valves are so controlled that they can take any desired angle, permitting forward or backward or vertical flight.

The control of the craft on air cushion suspension is accomplished by using four sets of horizontal vents, two forward and two rearward, one on each side of the aircraft fuselage. Controlling these horizontal vents each one separately permits the directional control of the aircraft in air suspension travelling.

In order to land the craft, the ram jet are stopped, or if needed the exhaust gases of the jet will be diverted by the mechanism described herein downwardly as to facilitate the landing of the craft under any condition. The craft is directed in its flight by using the longitudinal set of fins, moving them to the left or right according to the need to go to the right or left. In order to reverse the direction of flight of the craft from forward to backward, the cross fin pitch will be reversed. For directional purposes, any of the longitudinal fins can be used by reversing its pitch angle.

When the craft is on the ground, the power plant will be reduced to only one engine. The rotors, shafts and control connections will work together but the angle of the rotor blades will be at 0 point (zero point). A simple maneuver, only through a switch control in the gear box connected to the driving wheels, will cause an instant conversion to drive the craft as an automobile on the ground, the forward wheels being so connected as to permit control and steering the direction of the craft on the land. On water, the craft will be moved by its rotors operating in the same manner as in flight but at a lower degree of power, or by the air suspension principles.

The parachutes are adapted to be released instantly when danger is apparent, by a simple pressure on the handle whereby the rockets tied to the parachutes will be blown out of the compartment carrying the parachutes high into the air whereupon the parachutes open providing a safe landing of the craft and passengers.

When operating on snow and ice, the craft can use the driving mechanism for land vehicle or can use the air suspension drive, or by equipping the craft with skis the craft can slide over the snow and ice.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an aircraft of the type described,
   (a) an elongated fuselage having top, bottom, side, and end walls and being formed at the front and rear thereof with respective openings extending through said top and bottom walls and spaced from said side walls;
   (b) a rotor blade assembly mounted in each opening for rotation about a common axis of the opening and of the assembly;
   (c) drive means for jointly rotating said assemblies about the respective axes to generate an air stream in each opening in a direction from said top wall to said bottom wall;
   (d) wings arranged on said side walls and formed with respective passages therethrough in a direction substantially parallel to said side walls;
   (e) a jet engine in each passage adapted to exhaust a gas,
      (1) each wing being formed with two sets of vents for discharging the exhausted gas in a sideward direction and in a downward direction respectively,
      (2) said fuselage being formed with two sets of vents each in the lower front and rear portions thereof and directed in a horizontal direction, and with a further set of vents peripherally arranged in said bottom wall near said side walls, said further set being directed in a downward direction; and
   (f) control means for opening and closing said vents, for diverting said exhausted gas from said passage to either set of vents in said wing, and for diverting said air stream from said opening to said vents in said fuselage.

2. In an aircraft as set forth in claim 1, said control means including separate mechanisms for opening and closing each of said sets of vents in said fuselage.

3. In an aircraft as set forth in claim 1, said control means including a perforated shaft rotatably mounted in each wing for angular movement between a position in which the perforations of said shaft are aligned with one of said sets of vents for discharge of said exhausted gas through said perforations and the vents of said set in said sideward direction, and another angular position in which said shaft blocks said one set of vents; a worm gear on said shaft; and worm means engaging said worm gear for rotating said shaft between said positions thereof.

4. In an aircraft as set forth in claim 1, said control means including a perforated shaft rotatably mounted in each wing for angular movement between a position in which the perforations of said shaft are aligned with one of said sets of vents for discharge of said exhausted gas through said perforations and the vents of said set in said downward direction, and another angular position in which said shaft blocks said one set of vents; a worm gear on said shaft; and worm means engaging said worm gear for rotating said shaft between said positions thereof.

5. In an aircraft as set forth in claim 1, each passage having an exhaust opening in the direction of elongation of said fuselage, a plate member movable on each wing toward and away from a position in which said plate member closes an associated opening, yieldably resilient means biasing said plate member toward said position, and a tension member attached to said plate member for pulling said plate member away from said position.

6. In an aircraft as set forth in claim 1, said control means including a perforated elongated ratchet bar associated with each of said horizontally directed sets of vents in said fuselage, said bar being formed with a plurality of openings therethrough simultaneously alignable with the vents of the associated set, and actuating means for moving each ratchet bar toward and away from a position of alignment of the openings thereof with the associated vents.

7. In an aircraft as set forth in claim 6, said actuating means including a rotatable gear member meshingly engaging said ratchet bar for longitudinal movement of the same when said gear member rotates.

8. In an aircraft as set forth in claim 1, said control means including a plurality of valve members respectively arranged in the vents of said further set, an elongated ratchet bar, a plurality of pivots longitudinally spaced on said ratchet bar and connecting respective valve members to said bar for tilting movement of the valve members in the associated vents when said ratchet bar moves longitudinally, and means connecting said vents to one of said openings for discharge of respective portions of said air stream therethrough, the direction of discharge varying from an obliquely forward to an obliquely rearward direction when said valve members are tilted.

9. In an aircraft as set forth in claim 8, gear means meshingly engaging said ratchet bar for actuating longitudinal movement of said ratchet bar.

10. In an aircraft as set forth in claim 1, said control means including three series of plate shaped fin means axially spaced in each of said openings under the respective rotor blade assemblies.
   (1) the fin means of the first one of said series being swingable between an inoperative position in which said first series of fin means extends substantially axially in the opening for unimpeded passage of said air stream, and an operative position in which said fin means extend transversely of said axis for blocking said opening, (2) the fin means of a second series being swingable about respective axes extending in the direction of elongation of said fuselage toward and away from a position in which the fin means of said second series of fin means extend in the direction of the axis of the associated rotor assembly, and (3) the fin means of the third series being swingable about respective normally horizontal axes extending transversely of the direction of elongation of said fuselage toward and away from a position in which said fin means extend in the direction of the axis of said associated rotor assembly, (4) actuating means for jointly swinging the fin means of each series, and (5) admitting means responsive to movement of said first series of fin means into said operative position thereof for admitting said air stream from said opening to said further set of vents.

11. In an aircraft as set forth in claim 10, said actuating means including a worm gear on each fin means of said first series, a plurality of worms in simultaneous meshing engagement with said worm gears respectively, and shaft means connecting said worms for joint movement.

12. In an aircraft as set forth in claim 11, said first series of fin means being arranged in two groups, and said shaft means including two shaft members mounted in said fuselage for rotation about respective axes obliquely inclined relative to each other, said shaft members respectively carrying groups of said worms, and means for jointly rotating said shaft members.

13. In an aircraft as set forth in claim 10, said actuating means including a worm gear on each fin means of said second series, a shaft member having an axis, a plurality of worms coaxially mounted on said shaft member, and respectively meshing with said worm gears, and means for rotating said shaft member about said axis thereof.

14. In an aircraft as set forth in claim 10, said actuating means including a worm gear on each fin means of said third series, a shaft member having an axis and rotatably mounted in said fuselage, a plurality of coaxial worms mounted on said shaft member in axially spaced relationship and respectively meshing with said worm gears, and means for rotating said shaft member about the axis thereof.

15. In an aircraft as set forth in claim 10, said admitting means including door means movable between an open position in which said door means connects said opening to said further set of vents, and a closed position in which said door means substantially seals said further set of vents from said opening, yieldably resilient means biasing said door means toward the closed position thereof, and abutment means on a fin means of said first series engageable with said door means during movement of the fin means into the operative position thereof for moving said door means into said open position thereof against the restraint of said yieldably resilient means.

16. In an aircraft as set forth in claim 15, said control means further including a plurality of valve members respectively arranged in the vents of said further set, an elongated bar, a plurality of pivots longitudinally spaced on said bar and connecting respective ones of the valve members to said bar for tilting movement of the valve members in the associated vents when said bar moves longitudinally, and means for longitudinally moving said bar.

17. In an aircraft as set forth in claim 1, said rotor blade assembly including a housing having an axis and formed with radial openings, a plurality of blades respectively supported in said openings and radially extending from said housing, each blade having a terminal portion remote from said housing, a toothed turbine ring connecting said terminal portions, and rocket engine means mounted on said fuselage for discharging a stream of fluid against the teeth of said turbine ring and for thereby turning said blades and said housing about the axis thereof.

References Cited by the Examiner
UNITED STATES PATENTS

| | | | |
|---|---|---|---|
| 2,324,045 | 7/1943 | Vallinos | 244—139 |
| 2,377,835 | 6/1945 | Weygers | 244—23 |
| 2,392,448 | 1/1946 | Atherton | 244—139 |
| 2,410,967 | 11/1946 | Eaton | 244—102 |
| 2,454,611 | 11/1948 | Paraskevas | 244—102 |
| 2,624,081 | 1/1953 | Schweig | 20—19 |
| 2,663,372 | 12/1953 | Sikorsky | 170—135.26 |
| 2,829,721 | 4/1958 | Gebhard | 170—135.26 |
| 2,955,780 | 10/1960 | Hulbert | 244—23 |
| 3,033,492 | 5/1962 | Rowe | 244—23 |
| 3,061,242 | 10/1962 | Zurawinski et al. | 244—23 |
| 3,107,071 | 10/1963 | Wessels | 180—7 |
| 3,120,033 | 2/1964 | Andres | 20—19 |
| 3,123,320 | 3/1964 | Slaughter | 244—12 |
| 3,130,939 | 4/1964 | Alper et al. | 244—23 |

MILTON BUCHLER, *Primary Examiner.*

FERGUS S. MIDDLETON, *Examiner.*

R. G. BESHA, T. MAJOR, *Assistant Examiners.*